Sept. 17, 1968   W. M. HALSTEAD   3,401,480
FISHING DEVICE
Filed June 29, 1966   3 Sheets-Sheet 1
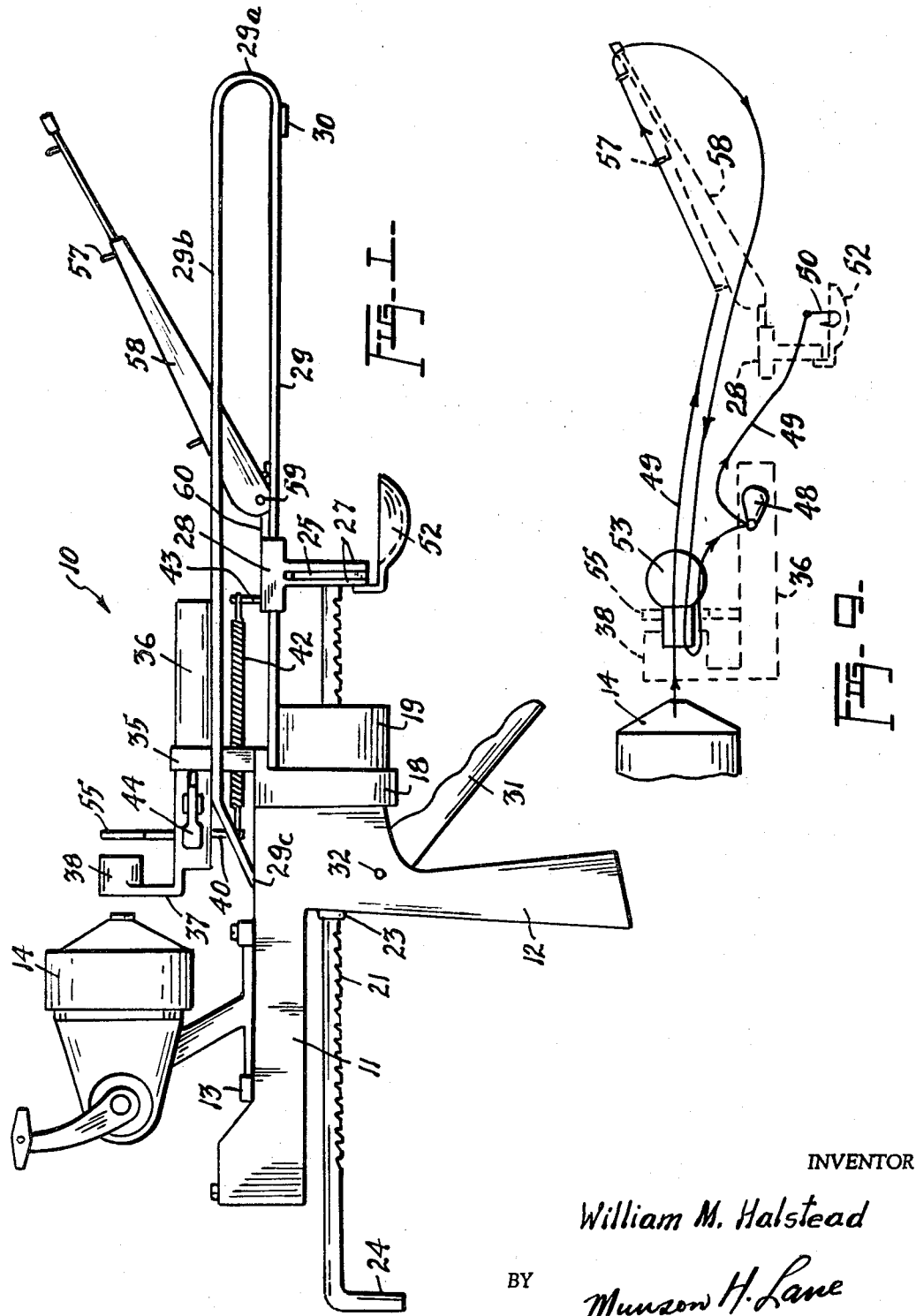
INVENTOR
William M. Halstead
BY
Munson H. Lane
ATTORNEY Sept. 17, 1968
W. M. HALSTEAD
3,401,480
FISHING DEVICE
Filed June 29, 1966
3 Sheets-Sheet 2
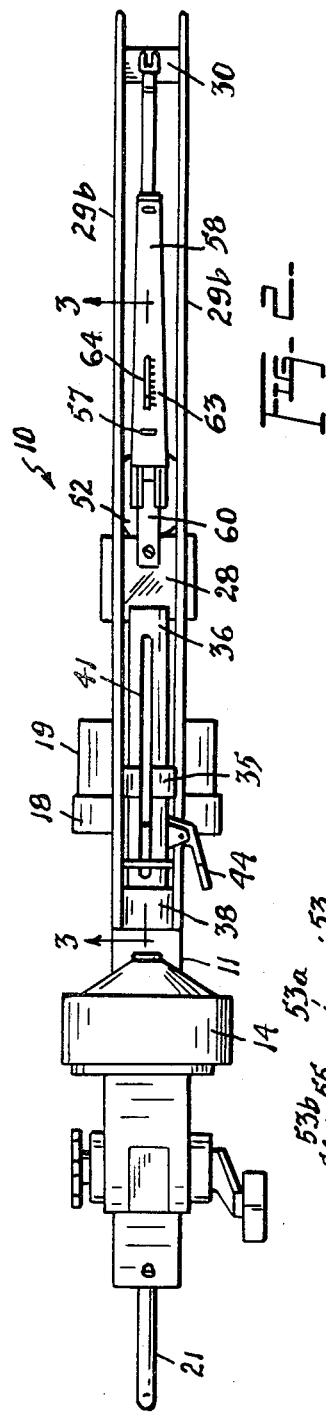
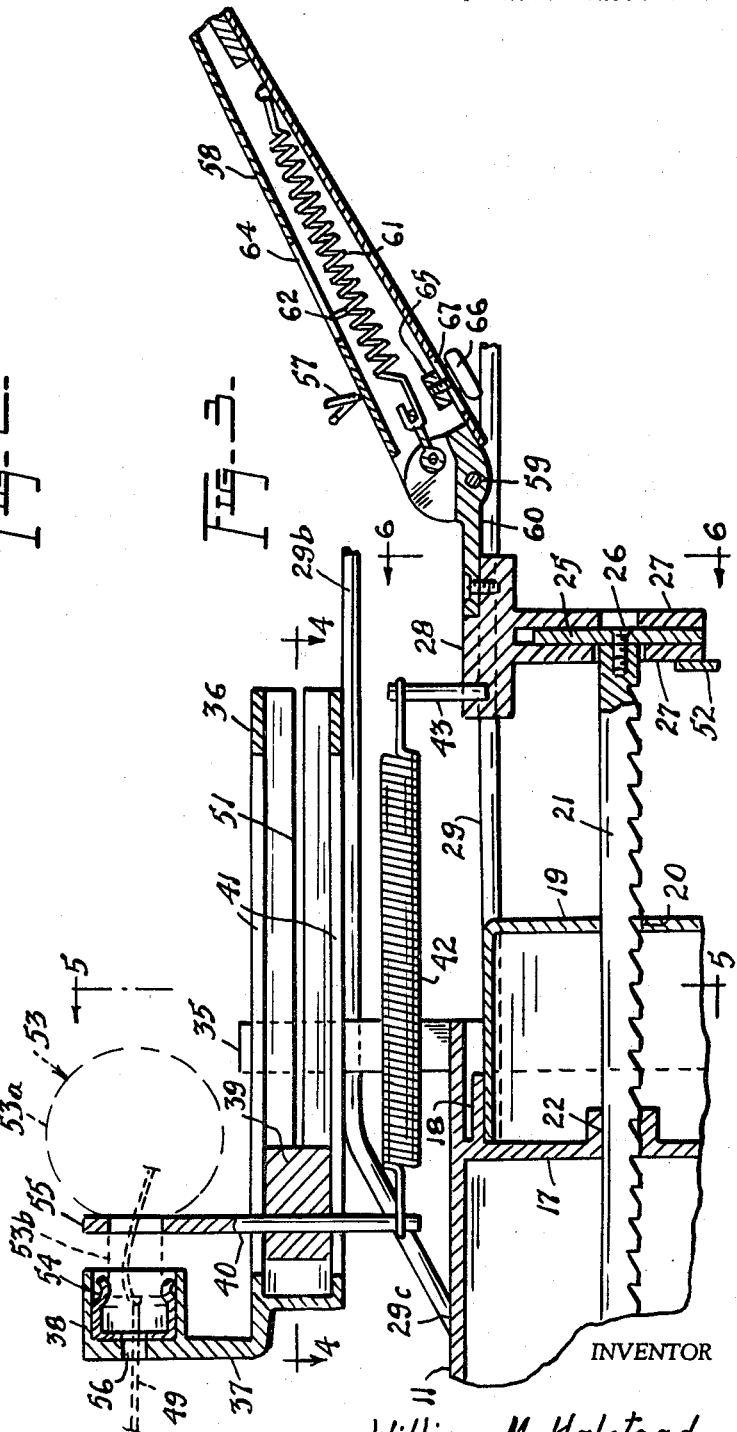
INVENTOR
William M. Halstead
BY
Munson H. Lane
ATTORNEY

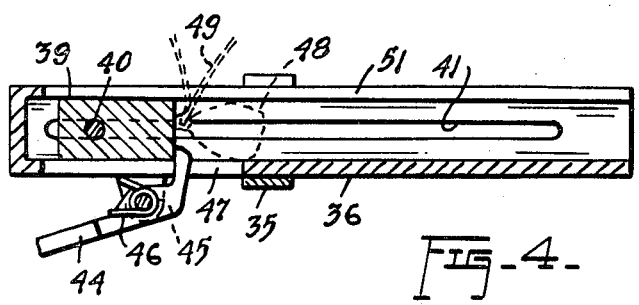
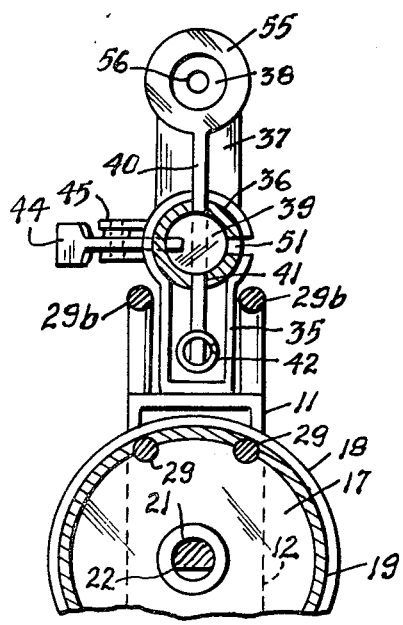
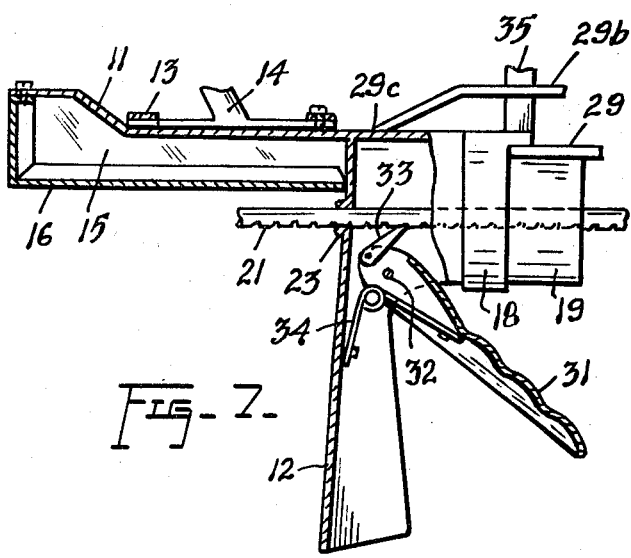
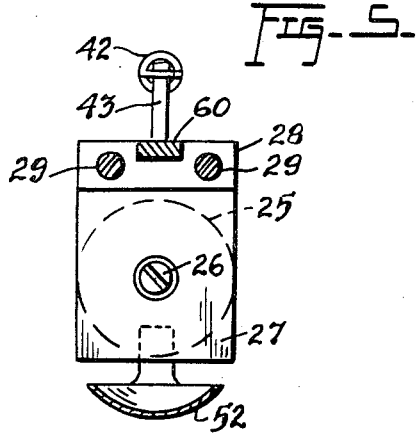
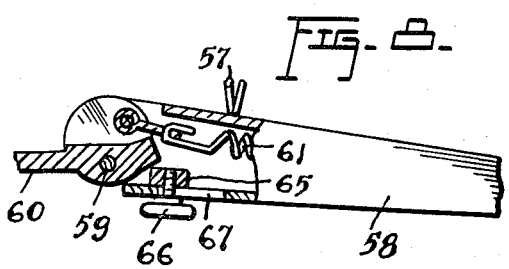

United States Patent Office 3,401,480
Patented Sept. 17, 1968

3,401,480
FISHING DEVICE
William M. Halstead, P.O. Box 195,
Linthicum Heights, Md. 21090
Filed June 29, 1966, Ser. No. 561,423
9 Claims. (Cl. 43—19)

This invention relates to new and useful improvements in fishing devices, and the principal object of the invention is to facilitate convenient and accurate casting of a line-attached hook, sinker and float by mechanical projection, in place of the usual casting rod.

As such, the device of the invention is compact in size and easily hand-held, the mechanical projecting mechanism permitting the line to be easily cast even when the fisherman is at a crowded location where swinging of a conventional casting rod could cause injury to others or where a conventional rod could not be used because of obstructions. Also, since the manipulation of the device does not require any substantial body movement, it may be safely used while the fisherman is standing in a boat or on a dock, without the danger of losing his balance.

Briefly, the device of the invention comprises a hand-held support on which a reel may be mounted and which carries the line projecting mechanism. Such mechanism includes a barrel for reception of a line-attached sinker, a socket for a line-attached float, and trigger-released, spring-actuated means for projecting the sinker from the barrel and the float from the socket so that the line is mechanically cast along with a baited hook or lure at its end.

The device, of course, may be easily aimed in any direction, and one important feature of the invention resides in the provision of means for pre-adjusting the tension of the projecting spring, whereby to correspondingly vary the distance to which the line is cast.

Another feature of the invention involves the provision of a selectively usable, spring-biased arm equipped with guiding means for the line, the spring-biased arm being capable of responding to a pull on the line so that it is possible to obtain an indication of the weight of a fish caught on the line before the fish is pulled out of water.

Other advantages of the invention reside in its simple construction, efficient and dependable operation, and in its adaptability to economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of the fishing device of the invention;

FIGURE 2 is a top plan view thereof;

FIGURE 3 is an enlarged, fragmentary longitudinal sectional view, taken substantially in the plane of the line 3—3 in FIG. 2;

FIGURE 4 is a fragmentary sectional detail, taken substantially in the plane of the line 4—4 in FIG. 3;

FIGURE 5 is a fragmentary sectional detail, taken substantially in the plane of the line 5—5 in FIG. 3;

FIGURE 6 is a fragmentary sectional detail, taken substantially in the plane of the line 6—6 in FIG. 3;

FIGURE 7 is a fragmentary sectional view of the support;

FIGURE 8 is a fragmentary sectional view of the line guiding arm in its lowered position; and FIGURE 9 is a diagrammatic illustration showing the relationship of the line to the various components of the device.

Referring now to the accompanying drawings in detail, the fishing device of the invention is designated generally by the reference numeral 10. The same embodies in its construction a horizontally elongated, hollow support 11 provided with a depending handle portion 12, by which the entire device may be conveniently held in one hand of a fisherman.

The top of the support 11 is provided with suitable keepers 13 for seating and holding a conventional reel 14, and the hollow rear end portion of the support constitutes a compartment 15 such as may be used for storage of lures, leaders, or other fishing equipment. The bottom and rear end of the compartment are closed by a removable, unitary cover 16, as will be apparent from FIG. 7.

The forward end portion of the support 11 has a transverse wall 17 with an annular flange 18 to removably receive a cup-shaped receptacle 19 which may also be used for storage of hooks, bait, sinkers, or other equipment. The receptacle 19 is formed at the center thereof with an aperture 20 for free sliding of the receptacle along a toothed rack 21, the purpose of which rack will be hereinafter described. In the meantime, however, it may be noted that the rack 21 extends slidably through a bearing 22 in the wall 17 (see FIG. 3) and through a similar bearing 23 in the handle 12 (see FIG. 7). The rear end of the rack 21 is formed with a finger-piece 24, while its front end has secured thereto a disc 25, as by a screw 26. Access to the interior of the receptacle 19 may be gained by sliding the same forwardly along the rack 21 sufficiently for the receptacle to become withdrawn from the flange 18, and it will be noted that when the receptacle is so withdrawn, it still remains on the rack and possible loss of the receptacle is avoided.

The aforementioned disc 25 of the rack 21 is interposed between a pair of spaced, parallel depending plates 27 of a slide 28 which is movable along a track constituted by a pair of spaced parallel rods 29. For this purpose, the slide is formed with a pair of bores to slidably receive the rods, and the rear ends of the rods are rigidly secured to the front end portion of the support 11. The forward end portions of the rods 29 are provided with a transverse brace 30, whereupon the rods are reversely bent as at 29a and continue rearwardly above themselves as at 29b, with the rear ends of the rod portions 29b being secured to the support 11 as at 29c, (see FIG. 3). As will be apparent from FIG. 5, it may be necessary to provide the side wall of the receptacle 19 with cut-outs or notches, to afford clearance for the rods 29.

As shown in FIG. 7, a hand grip 31 is pivoted to the handle 12 by a pin 32, and a spring-pressed pawl 33 is pivoted to the hand grip so as to operatively engage the teeth of the rack 21 and impart a step-by-step forward sliding movement to the rack when the grip 31 is pressed toward the handle. A suitable spring 34 is utilized for biasing the grip 31 away from the handle when pressure on the hand grip is released, and it will be understood that the forward movement imparted to the rack 21 by actuation of the grip 31 will cause the slide 28 to move forwardly along the rods 29, the purpose of which will be hereinafter explained. However, the rack 21 is rotatable as well as slidable in the bearings 22, 23 and the teeth are cut only on one side of the rack, so by turning the finger-piece 24 of the rack through approximately 180°, the rack teeth will become disengaged from the pawl 33 and the rack may then be pulled rearwardly so as to correspondingly slide the slide 28 rearwardly along the rods 29.

The front end of the support 11 carries a rigid bracket 35 which supports a cylindrical barrel 36 somewhat above and in parallel to the rods 29. The barrel 36 has an open front end and its closed rear end is provided with an upward extension 37 supporting a cup-shaped socket 38.

A piston-like projector member 39 is slidably positioned in the barrel 36 and carries a vertical pin 40 which projects both downwardly and upwardly through longitudinal slots 41 formed at the bottom and top of the barrel. The lower end portion of the pin 40 has anchored thereto one end of a tension spring 42, the other end of which spring is anchored to an upstanding pin 43 on the slide 28. Thus, the spring 42 causes the projector member 39 to slide forwardly in the barrel 36, but means are provided for releasably locking the member 39 in the rear end portion of the barrel, against the action of the spring 42. These means comprise a trigger 44 which is pivotally mounted between a pair of ears 45 at one side of the barrel and is biased by a spring 46 to project into the barrel through a side slot 47, the thus projected trigger abutting the front end of the member 39 and preventing forward sliding of that member by the spring 42 until the trigger 44 is depressed and withdrawn from the barrel.

The barrel 36 is adapted to receive therein, forwardly of the member 39, a sinker 48 secured to intermediate the ends of a line 49 in spaced relation to a lure or hook 50 at the end of the line (see FIGS. 4 and 9), the line 49 projecting outwardly through a lateral, open-ended slot 51 formed in the barrel. The lure or baited hook may be conveniently accommodated on a spoon-shaped carrier 52, supported by one of the plates 27 of the slide 28, as will be clearly apparent.

The usual float 53 is attached to the line 49 in spaced relation from the sinker 48, the float including a spherical body portion 53a and a cylindrical stem portion 53b which, as shown in FIG. 3, is adapted to be removably held by resilient fingers 54 inside the aforementioned socket 38. The stem portion of the float projects forwardly from the socket 38 to a sufficient extent to be encircled by an eye 55 provided at the upper end of the aforementioned pin 40 of the projector member 39, so that when the member 39 is slid forwardly in the barrel 36 by the spring 42 to discharge the sinker 48 from the barrel, the eye 55, engaging the spherical portion 53a of the float from the rear, simultaneously projects the float 53 forwardly from the socket 38. It will be noted that the socket 38 is formed with a central opening 56 through which the line 49 may pass from the reel 14 into the socket.

Manifestly, the projecting power imparted by the member 39 to the sinker and by the eye 55 to the float is governed by the tension of the spring 42, which may be pre-set or adjusted by actuating the hand grip 31 which slides the slide 28 along the rods 29 so as to stretch the spring 42 to a greater or lesser extent, while the member 39 is locked in the rear end portion of the barrel 36 by the trigger 44. In this manner, the range or distance of line projection by the device may be varied, and when the tension of the spring has been pre-adjusted as already explained, the float 53 is applied to the eye 55 and to the socket 38, and the sinker 48 is inserted into the barrel 36, with the lure or baited hook resting in the carrier 52. The device may then be aimed in the desired direction and when the trigger 44 is depressed, the spring 42 will forcibly slide the member 39 forwardly in the barrel to project the sinker therefrom, while the float is simultaneously projected from the socket 38 by the eye 55. The hook 52, of course, will be picked up out of the carrier 52 by the projection of the float and sinker attached to the line 49, and casting by mechanical projection will thus be effectively attained.

Although the line 49 may be taken from the reel 14 directly to the float 53 in the socket 38 and then to the sinker 48 in the barrel 36 as already described, it may be desirable to provide guiding means for the line, either before or after casting. Such guiding means comprise a plurality of laterally open eyes 57 carried by a longitudinally extensible and contractable arm 58, which is pivoted as at 59 to a bracket 60 secured to the slide 28. The arm 58, constructed very much like a conventional automobile windshield wiper arm, may be raised and lowered about the pivot 59, being biased to a raised position by a built-in tension spring 61. A pointer 62 is secured to the spring for movement relative to a graduated scale 63 marked on the arm 58 (see FIGS. 2 and 3), the pointer being visible through a slot 64 with which the arm is provided. When a fish pulls on the line after a cast has been made, tensioning of the line causes the arm 58 to move downwardly, thus stretching the spring 61 which in turn moves the pointer 62 relative to the scale 63. In this manner an indication is obtained as to the weight of the fish pulling on the line.

The line 49 may be applied to the eyes 57 on the arm 58 before the cast is made by the mechanical projecting means, in which event the line is taken from the reel 14 through the opening 56 in the socket 38 directly to the arm 58 and then back to the socket 38 where the float 53 is positioned, as illustrated in FIG. 9. Alternatively, the line may be taken from the reel 14 directly to the float in the sockets as previously described, and after the cast is made the line may be applied laterally to the eyes 57 on the arm 58 so that the arm may function as aforesaid. In either instance, it is preferable to have the arm 58 out of the way during the mechanical projection of the line, and for this reason means are provided for releasably locking the arm in its lowered position.

This locking means comprises an abutment block 65 disposed in the pivoted end portion of the arm 58 and provided with a wing bolt 66 which projects outwardly through a slot 67 in the arm. When the block 65 is in the position shown in FIG. 3, the arm 58 may be raised and lowered. However, when the arm is lowered as shown in FIG. 8 and the block 65 is slid into abutment with the bracket 60, raising of the arm is prevented. Of course, the block 65 is held in either of its positions by simply tightening the wing bolt 66.

While in the foregoing there has been described and shown the preferred embodiment of the invention, various modifications may become apparent to those skilled in the art to which the invention relates. Accordingly, it is not desired to limit the invention to this disclosure and all modifications and equivalents may be resorted to, such as may fall within the spirit and scope of the invention as claimed.

What is claimed as new is:

1. A fishing device of the character described, comprising in combination, a hand-held support having a seat thereon for a reel, and a mechanical line projecting mechanism provided on said support adjacent said reel seat, said mechanism including a barrel adapted to receive therein a line-attached sinker, a projector member slidable in said barrel from a set position to a sinker projecting position, trigger means releasably retaining said projector member in its set position, means for releasably securing a line-attached float on said support, means for projecting said line-attached float, and resilient means connected to said projector member for sliding the same to the sinker projecting position when said trigger means is released.

2. The device as defined in claim 1 wherein said float securing means comprises a socket provided adjacent said barrel for receiving said line-attached float, and said float projecting means comprises an extension provided on said projector member in cooperating relation to said socket.

3. The device as defined in claim 1 together with means for preadjusting the force of said resilient means in the set position of said projector member.

4. The device as defined in claim 1 together with an elongated track provided on said support in parallel relation to said barrel, a slide movable along said track, said resilient means comprising a tension spring connected at one end thereof to said projector member and at its other end to said slide, and hand-actuated means on said support for moving said slide to a selected position on said track, whereby to pre-adjust the tension of said spring in the set position of said projector member.

5. The device as defined in claim 4 wherein said support includes an upper portion provided with said reel seat and having said barrel and said track mounted thereon, said support also including a depending handle portion, said means for moving said slide including a toothed rack slidable through the handle portion of the support and connected at one end thereof to said slide, a hand grip pivoted to said handle portion, and a pawl carried by said hand grip and coacting with the teeth of said rack for step-by-step advancing the latter and moving said slide along said track to increase the tension of said spring when said hand grip is actuated.

6. The device as defined in claim 5 wherein said rack is rotatable in said handle portion to disengage the teeth thereof from said pawl and permit the rack to be retracted.

7. The device as defined in claim 4 together with a carrier supported by said slide for a line-attached bait.

8. The device as defined in claim 4 together with an arm pivoted to said slide for raising and lowering movement, a set of line guiding eyes provided at spaced points on said arm, and resilient means biasing said arm to its raised position, the extent of lowering of said arm against the action of said last mentioned resilient means serving to indicate the weight of a fish caught on the line.

9. The device as defined in claim 8 together with means for releasably locking said arm in its lowered position.

References Cited

UNITED STATES PATENTS

| | | | |
|---|---|---|---|
| 1,473,507 | 11/1923 | Obermaier | 43—19 |
| 2,305,176 | 12/1942 | Littman | 43—19 |
| 2,873,547 | 2/1959 | Coelho | 43—19 |
| 3,000,129 | 9/1961 | Rainey | 43—19 |
| 3,001,316 | 9/1961 | Fefelov | 43—19 |
| 3,143,822 | 8/1964 | Schooley | 43—24 X |

WARNER H. CAMP, *Primary Examiner.*